(12) United States Patent
Favazza et al.

(10) Patent No.: US 7,747,856 B2
(45) Date of Patent: Jun. 29, 2010

(54) SESSION TICKET AUTHENTICATION SCHEME

(75) Inventors: John Favazza, Boxford, MA (US); James Ducharme, Somersworth, NH (US); Rich Levinson, Concord, MA (US); Prateek Mishra, Newton, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1051 days.

(21) Appl. No.: 10/626,208

(22) Filed: Jul. 24, 2003

(65) Prior Publication Data

US 2004/0139319 A1 Jul. 15, 2004

Related U.S. Application Data

(60) Provisional application No. 60/398,654, filed on Jul. 26, 2002.

(51) Int. Cl.
*H04L 9/32* (2006.01)
(52) U.S. Cl. .............. 713/168; 713/151; 713/153; 713/161; 726/5; 726/17; 726/26; 709/225
(58) Field of Classification Search .............. 713/168; 726/30
See application file for complete search history.

(56) References Cited

U.S. PATENT DOCUMENTS

| | | | | |
|---|---|---|---|---|
| 5,684,950 | A * | 11/1997 | Dare et al. | 726/10 |
| 6,609,198 | B1 * | 8/2003 | Wood et al. | 713/155 |
| 6,826,696 | B1 * | 11/2004 | Chawla et al. | 726/4 |
| 6,839,680 | B1 * | 1/2005 | Liu et al. | 705/10 |
| 6,959,336 | B2 * | 10/2005 | Moreh et al. | 709/229 |
| 7,016,960 | B2 * | 3/2006 | Howard et al. | 709/225 |
| 2002/0010776 | A1 * | 1/2002 | Lerner | 709/225 |
| 2003/0061512 | A1 * | 3/2003 | Flurry et al. | 713/201 |
| 2003/0135628 | A1 * | 7/2003 | Fletcher et al. | 709/229 |
| 2003/0163733 | A1 * | 8/2003 | Barriga-Caceres et al. | 713/201 |
| 2003/0177388 | A1 * | 9/2003 | Botz et al. | 713/201 |

OTHER PUBLICATIONS

Mishra et al.,Security Services Markup Language, Jan. 18, 2001.*
Hallam-Baker, Phillip, Security Assertions Markup Language, Draft Version, Feb. 16, 2001.*
"XML Key Management Specification (XKMS)", W3C Note 30, Mar. 2001, Verisign Inc. , Mar. 2001, pp. 28-45.*
"Security Assertions Markup Language (SAML)", Netegrity, May 20, 2001, pp. 1-7.*

* cited by examiner

*Primary Examiner*—Matthew B Smithers
*Assistant Examiner*—Shewaye Gelagay
(74) *Attorney, Agent, or Firm*—Baker Botts L.L.P.

(57) ABSTRACT

A method of propagating a user's authentication/session information between different requests to Web services in a network includes a web server receiving a request for access to a first web service. The request is intercepted with an agent and authentication credentials are collected. A determination is made whether the web service customer is authenticated and authorized. If the web service customer is authenticated and authorized, a session and session ticket are created. An ID and the session ticket are returned to the web server. The session ticket ID and a public key are encrypted into an assertion. The assertion is sent to the first web service. The assertion is then returned to the web service customer for use with future requests. The assertion can be in the form of a SAML assertion.

24 Claims, 7 Drawing Sheets

SESSION TICKET AUTHENTICATION SCHEME

RELATED APPLICATION

This application claims priority to, and the benefit of, U.S. Provisional Application No. 60/398,654, filed Jul. 26, 2002, for all subject matter common to both applications. The disclosure of said provisional application is hereby incorporated by reference in its entirety.

FIELD OF THE INVENTION

The present invention relates to an authentication scheme suitable for determining user access in a network, and more particularly to a system and method for authentication and authorization of a user attempting to access Web services without repetitive re-authentication and re-authorization requirements, providing single sign-on functionality.

BACKGROUND OF THE INVENTION

Web services are a standardized way of integrating Web-based applications using various standard languages and interfacing technology (e.g., XML, SOAP, WSDL, and UDDI) available to the public over an Internet protocol backbone. The extensible markup language (XML) is used to tag the data being sent or received. Tagging involves inserting a command in a document that specifies how the document, or a portion thereof, should be formatted. Tags are utilized by all format specifications that store documents as text files. Simple Object Access Protocol (SOAP) provides a way for applications to communicate with each other over the Internet, regardless of platform. SOAP uses XML to define the format of the information, and then adds the necessary Hyper-Text Transfer Protocol (HTTP) headers to send it to a destination. Web Services Description Language (WSDL) is an XML formatted language used to describe the capabilities of a Web service as collections of communication endpoints capable of exchanging messages. Universal Description, Discovery, and Integration (UDDI) is a Web-based distributed directory that enables businesses to list themselves on the Internet and discover each other, similar to a phone book for the Internet.

Web services are used primarily for businesses to communicate with each other, and with clients, allowing organizations to communicate data without intimate knowledge of each other's information technology systems behind firewalls. Firewalls are systems used to prevent unauthorized access to or from private networks. Most often, firewalls are used to prevent Internet users from gaining unauthorized access to a company's or individual's private computer network.

In addition, Web services allow different applications from different sources to communicate with each other without specific coding. All Web service communication occurs in the XML language, so Web services are not tied to a specific operating system or programming language. Instead, Web services can communicate with, and facilitate communication between, multiple different operating systems and languages.

Often, the many users of the Internet, including businesses and clients, have a need for sharing information or data in a secure environment. The Security Assertions Markup Language (SAML) is an XML framework for exchanging security information between parties over the Internet or other distributed network. Many businesses are developing partnerships on the Web. As a result, there is an increase in user-initiated transactions in business-to-consumer scenarios, and XML initiated transactions in business-to-business scenarios. A transaction initiated at one site can be completed at a different site, requiring security information to be shared among the various Web sites involved in a single transaction.

The basic SAML objects are assertions, such as authentication assertions and authorization attributes (attributes that a service uses to make authorization decisions, such as an identifier, a group or role, or other user profile information). SAML assertions are submitted to, and generated by, trusted authorities using a request/response protocol. SAML assertions are embedded in transport and messaging frameworks. SAML defines a message format and protocol for distributing SAML data among trusted partners in a business relationship. SAML's message protocol supports putting data assertions from an authoritative source to a receiver. This allows the exchange of event notifications between to parties in a trusted relationship.

Currently, there is no solution enabling one to propagate a user's authentication/session information between different requests to Web services. The user must be authenticated each time he/she accesses a Web service. The authentication process takes time, thus with each pause for authentication, the user's interaction with the different Web services is made slower.

SUMMARY

The present invention is directed toward a method of propagating a user's authentication/session information between different requests to Web services. In accordance with one embodiment of the present invention, in a network including at least one electronic device, a method of authentication of a web service customer includes a web server receiving a request for access to a first web service. The request is intercepted with an agent and authentication credentials are collected. A determination is made whether the web service customer is authenticated and authorized. If the web service customer is authenticated and authorized, a session and session ticket are created. An ID and the session ticket are returned to the web server. The session ticket ID and a public key are encrypted into an assertion. The assertion is sent to the first web service. The assertion is returned to the web service customer.

The method can further include the web service customer inserting the assertion, and a signature into a document. The web server can receive a request for access to a second web service. The request can be intercepted with the agent and authentication credentials collected. A determination is made whether the assertion is valid. If the assertion is valid, a determination is made whether the web service customer is authenticated. If the web service customer is authenticated, the web service customer is granted access to the second web service.

In accordance with aspects of the present invention, the request can be in the form of a SAML assertion.

In accordance further with aspects of the present invention, receiving a request can include the web server receiving a public key and a request for access to a web service. Intercepting the request can include an XML agent intercepting the request and gathering authentication credentials. Determining whether the web service customer is authenticated and authorized can include comparing the web service customer with a database containing authentication and authorization data.

In accordance with another embodiment of the present invention, in a network including at least one electronic device, a method of authentication of a web service customer includes the web service customer inserting an assertion and a signature into a document. A web server receives a request for access to a web service. The request is intercepted with an agent and authentication credentials are collected. A determination is made whether the assertion is valid. If the assertion is valid, a determination is made whether the web service customer is authenticated. If the web service customer is authenticated, the web service customer is granted access to the web service.

In accordance with another embodiment of the present invention, in a network including at least one electronic device, a method of authentication of a web service customer includes the web service customer sending a request for access to a first web service. A web server receives an encrypted assertion and public key for incorporation into future requests. The web service customer is then granted access to the first web service. The method can further include inserting the encrypted assertion and public key, and a signature, into a document, requesting access to a second web service, and being granted access to the second web service.

In accordance with another embodiment of the present invention, in a network including at least one electronic device, a method of authentication of a web service customer includes a web server receiving a request for access to a first web service. The request is intercepted and authentication credentials are gathered. A determination is made whether the web service customer is authenticated and authorized. If the web service customer is authenticated and authorized, a session and session ticket are created. An ID and the session ticket are then returned to the web server. The session ticket ID, a public key, and a private key are encrypted into an assertion. The assertion is sent to a first web service.

The method can further include receiving a request from the first web service for access to a second web service, intercepting the request with the agent and collecting authentication credentials, determining whether the assertion is valid, if the assertion is valid, determining whether the web service customer is authenticated, and if the web service customer is authenticated, granting the first web service access to the second web service.

In accordance with aspects of the present invention, receiving a request can include receiving an XML document without a public key. Intercepting the request can include an XML agent intercepting the request and gathering authentication credentials. Determining whether the web service customer is authenticated and authorized can include comparing the web service customer with a database containing authentication and authorization data.

In accordance with another embodiment of the present invention, in a network including at least one electronic device, a method of authentication of a source of a document includes a third party receiving a document from a previously authenticated first source. The third party forwards the document to a predetermined authentication system responsible for previously authenticating the first source to authenticate the source. The third party then receives an indication of validation as to whether the document originated with the first source.

In accordance with aspects of the present invention, receiving a document can include a web server receiving a public key and a request for access to a web service. Receiving a document can alternatively include receiving an XML document without a public key. The predetermined authentication system can include an XML agent intercepting the request and gathering authentication credentials. Determining whether the document originated with the first source can include comparing the first source with a database containing authentication and authorization data.

BRIEF DESCRIPTION OF THE DRAWINGS

The present invention will become better understood with reference to the following description and accompanying drawings, wherein.

DETAILED DESCRIPTION

Figure 1:
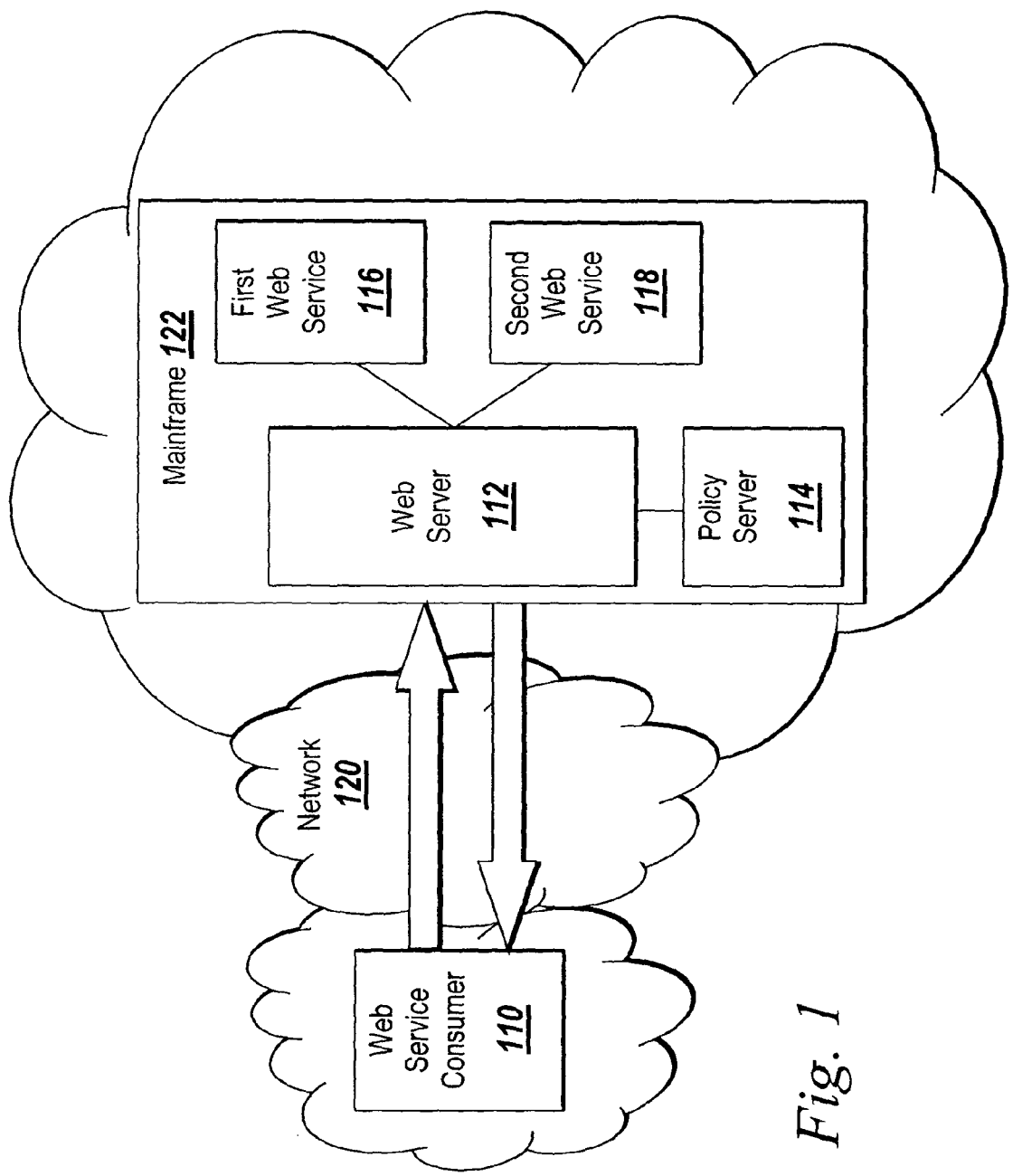
FIG. 1 is a diagrammatic illustration of an example network within which the present invention can operate.

An illustrative embodiment of the present invention relates to a SAML session ticket authentication scheme, which provides a mechanism for single sign-on across Web services hosted by the same policy server. The mechanism that enables single sign-on is an encrypted token embedded in a SAML assertion, which is a piece of data that contains a session ticket and a public key. The SAML assertion is utilized by the SAML session ticket authentication scheme to verify there is a valid session, and to ensure the integrity of the signed XML document. By including the session ticket and the public key in the assertion, a client can access Web services that share the same policy server without being re-challenged for credentials. In accordance with the teachings of the present invention, the user can authenticate once, using any of the Policy Server authentication schemes associated with the present invention, and a SAML assertion will be generated that binds the session ticket with the user's public key, or a public key supplied by an Agent, such as the Netegrity Agent produced by Netegrity, Inc. of Waltham, Mass. This assertion can then be used for authentication on subsequent requests to Web services in this domain.

Prior to discussing the invention, the following terms and phrases as utilized herein have the conventional industry definitions as summarized below. These definitions are intended merely to serve as a quick reference in reading this disclosure, but do not limit the interpretation of each term to only that which is provided in the definition. The following terms and phrases are to be interpreted in accordance with convention in the industry:

"authentication"—This term generally refers to the process of identifying a user or client, typically with use of a name and password.

"authorization"—This term generally refers to the process of granting or denying access to a network resource or application. Often, network security systems utilize a two-step process. First is authentication, wherein a user identity is verified. Second is authorization, which determines what applications or resources the user is permitted to access within the network or enterprise.

"non-repudiation"—This term generally refers to the assurance that a transferred message has been sent and received by the parties claiming to have sent and received the message. Non-repudiation is often realized by use of digital signatures, confirmations services, and/or time stamps.

"Policy Server"—This term generally refers to the server within a network or enterprise system that controls the policies of the system, including access of information and clients to and from the system.

"public key"—This term is used in conjunction with a "private key" when discussing cryptographic systems. The public key is available to everyone, while the private key is known only to the intended recipient of the message. The public key and private key are related, such that only the public key can be used to encrypt a message and only the corresponding private key can be used to decrypt the message. When Party A wants to send a secure message to Party B, Party A encrypts the message using Party B's public key, and Party B can then decrypt using the private key.

"secure sockets layer (SSL)"—This term generally refers to a protocol developed for transmitting private documents via the Internet. SSL uses a public key to encrypt data transferred over the SSL connection.

"session ticket"—This term generally refers to a ticket containing general information about a user and that user's authentication information. The session ticket is used to identify the user's session across all sites in a single sign-on environment.

"single sign-on"—This term generally refers to an authentication process in a client/server relationship, where the user (or client) can enter a single name and password. The single entry of name and password enables the user to gain access to more than one application or resource within an enterprise, without repeatedly entering names and passwords for authentication purposes.

FIGS. 1 through 3C, wherein like parts are designated by like reference numerals throughout, illustrate example embodiments of an authentication and authorization scheme according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, in a manner still in keeping with the spirit and scope of the present invention.

As stated previously, the SAML session ticket authentication scheme in accordance with the teachings of the present invention provides a mechanism for single sign-on across multiple Web services hosted by the same Policy Server. The mechanism that enables single sign-on is a SAML assertion containing an encrypted token that is comprised of a session ticket and a public key. The SAML session ticket authentication scheme utilizes the SAML assertion to verify that there is a valid session, and to ensure the integrity of the signed XML document (i.e., to ensure that the XML document was signed by the same party that obtained the valid single sign-on session).

For an assertion to be generated, the Policy Server first must authenticate and authorize the client. The authorizing policy must have a response configured with it that issues SAML response data. The XML Agent utilizes the response data to generate the assertion. The assertion passes to clients who then use the assertion to gain access to Web services protected by the SAML session ticket authentication scheme. The SAML response can be configured to place the assertion within a SOAP document or in an HTTP header separate from the XML document.

In accordance with one example embodiment, the SAML session ticket authentication scheme works in conjunction with a proxy authentication service model. A proxy authentication service is a configuration in which there is only one authentication service responsible for authenticating clients. The authentication verifies the client identity, and then returns a SAML assertion that the client can use for subsequent requests without re-authenticating.

When a client makes a request for a Web service, the client must obtain the assertion from the authentication service, which is protected by an XML Agent. The assertion can be obtained using any secure method of authentication, including a signed XML document. The initial request must also provide a public key to the XML Agent, which can be accomplished by inserting the public key into the XML document, or obtaining the public key from a Policy Server user directory.

After client authentication, the client enters the authorization process. If the client successfully completes the authorization process with one or more authorization, the XML Agent responds with a SAML assertion containing a session ticket and the client's public key, bound together by encryption.

The authentication service passes the assertion to the client for subsequent Web service requests. The client does not get challenged again by other Web services hosted by the same Policy Server because the requesting SOAP document contains the assertion and the XML document. The client must, however, sign each XML document request using its private key associated with the public key provided during authentication.

FIG. 1 illustrates an example network configuration upon which the present invention can operate. A web service consumer 110 can communicate with a mainframe 122 or other destination through a network 120, such as the Internet. The web service consumer 110 and mainframe 122 are representative of a number of different electronic devices. Electronic devices suitable for practicing the illustrative embodiments of the present invention are representative of a number of different technologies, such as mainframe computers, servers, personal computers (PCs), laptop computers, workstations, personal digital assistants (PDAs), Internet appliances, mobile telephones, card readers, and the like. Electronic devices include some form of a central processing unit (CPU), or processing device, and may include a display device. The display device allows an electronic device to communicate directly with a user through a visual display. The electronic device may also include input devices such as a keyboard, mouse, stylus, trackball, joystick, touch pad, touch screen, and the like. The electronic device typically includes primary storage and sometimes secondary storage for storing data and instructions. The storage devices can include such technologies such as a floppy drive, hard drive, tape drive, optical drive, read-only memory (ROM), random access memory (RAM), and the like. Applications such as browsers, JAVA virtual machines (JAVA is a trademark and/or registered trademark of Sun Microsystems, Inc. of Mountain View Calif., in the United States and other countries), and other utilities and applications can be resident on one or more storage devices. The electronic device often includes a network interface for communicating with one or more electronic devices external to the electronic device. A modem is one form of establishing a connection with an external electronic device or network. The CPU has attached thereto, either internally or externally, one or more of the aforementioned components.

The web service consumer 110, using an electronic device, can communicate via the network 120 with the mainframe 122. The mainframe 122, or equivalent electronic device, can include a web server 112 connected with a policy server 114 and a plurality of web services, such as a first web service 116 and a second web service 118. The web service consumer 110 and the mainframe 122 all become part of the network 120 when they communicate with one another. The electronic devices that communicate via the network 120 run operating systems, such as a Windows® series operating system offered by Microsoft Corporation, or Unix® operating system offered by Unix System Laboratories, Inc., and the like.

The network 120 may include other hardware and software components as well. For example, firewalls (not shown) may be configured to prevent unauthorized access to components of the network 120. The firewalls may be implemented in hardware, in software, or as a combination of hardware and software.

One of ordinary skill in the art will appreciate that FIG. 1 illustrates only one example network configuration, for the sake of clarity. However, a number of different configurations are possible, as understood by one of ordinary skill in the art.

Figure 2A:
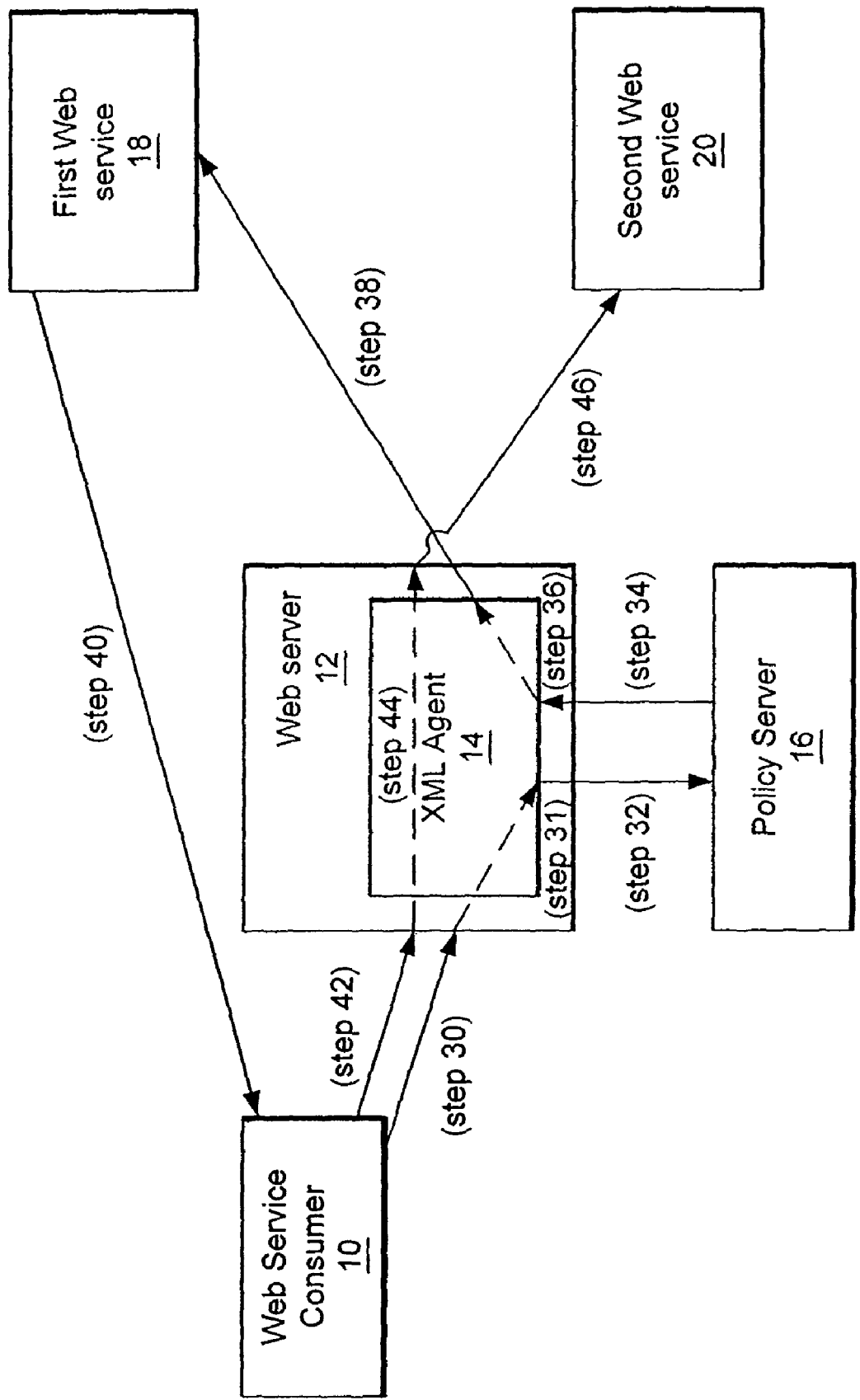
FIG. 2A is a diagrammatic illustration of an authentication scheme, according to one aspect of the present invention.
Figure 2B:
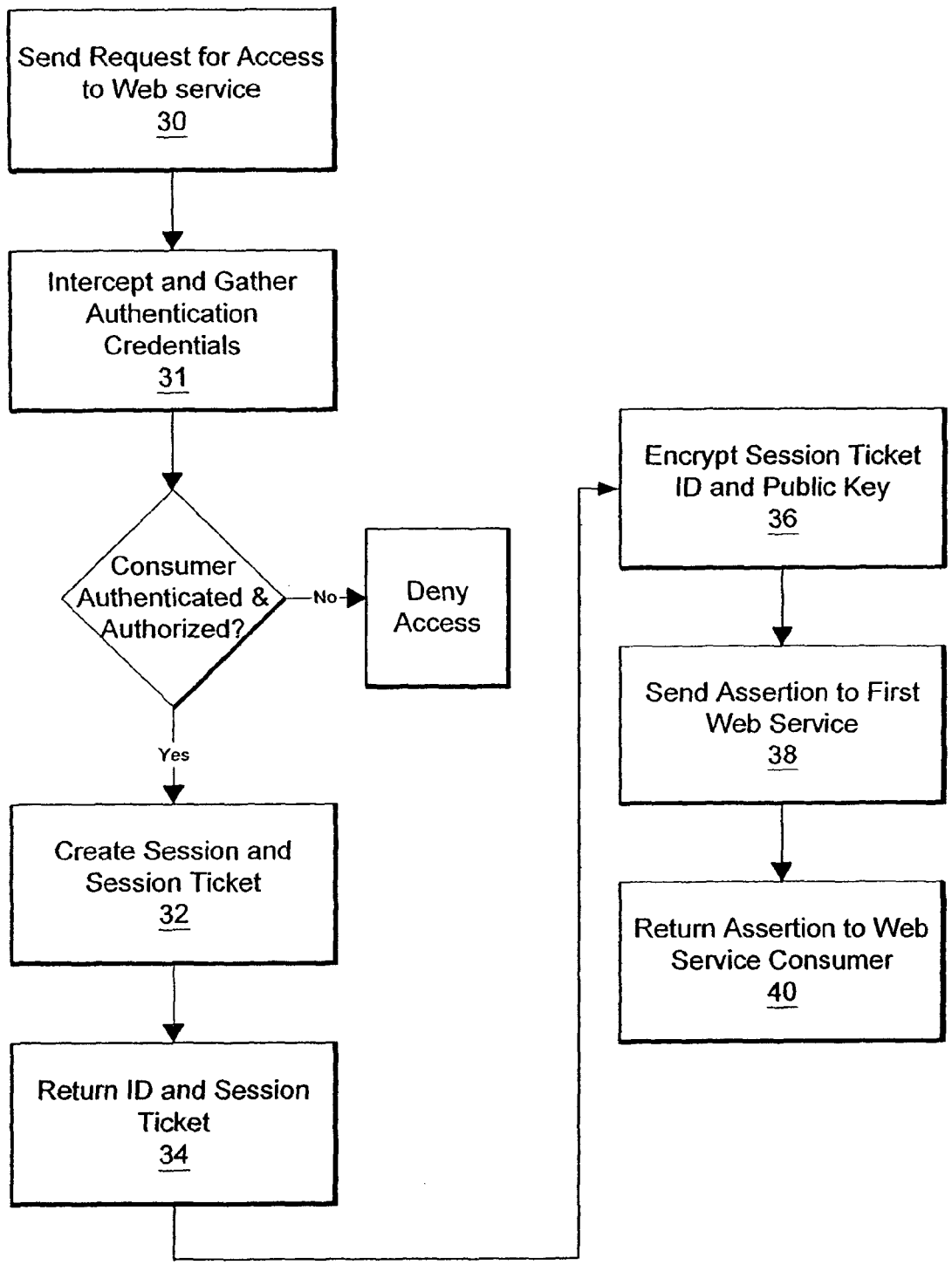
FIG. 2B is a flow chart showing a series of steps in the authentication scheme of FIG. 2A, according to one aspect of the present invention.

FIGS. 2A and 2B illustrate one example process for implementing the proxy authentication service. A client in the form of a Web service consumer 10 first sends a request to a Web server 12 to access a first Web service 18 (step 30). An XML agent 14 intercepts the request and gathers the authentication credentials of the user associated with the Web service consumer 10 (step 31). As part of the request, a public key must be made available to the XML Agent 14. If the Web service consumer 10 is authenticated and authorized for access to the first Web service 18, the XML Agent 14 instructs the creation of a session and session ticket within a Policy Server 16 (step 32). The determination of whether the Web service consumer 10 is authenticated and authorized cab result from, for example, a comparison of the credentials provided by the consumer 10 against a database containing records of consumers that are allowed to gain access to the Web server 12. If either authentication or authorization fails, the Web service consumer 10 is denied access to the requested Web service.

Returning to the case of valid authentication and authorization, the ID for the session ticket is passed back to the XML Agent 14 (step 34). This authentication process is carried out using an authentication scheme other than the SAML session ticket scheme (e.g., X.509 digital certificates). The XML Agent 14 encrypts the concatenation of the session ticket ID and the public key of the user with a private key (step 36). The XML Agent 14 then places the encrypted concatenation inside a SAML assertion, places the assertion into an HTTP or SOAP envelope header, and sends the SAML assertion to the first Web service 18 (step 38). The first Web service 18 then returns the assertion to the Web service consumer 10 in an XML document (step 40).

Figure 2C:
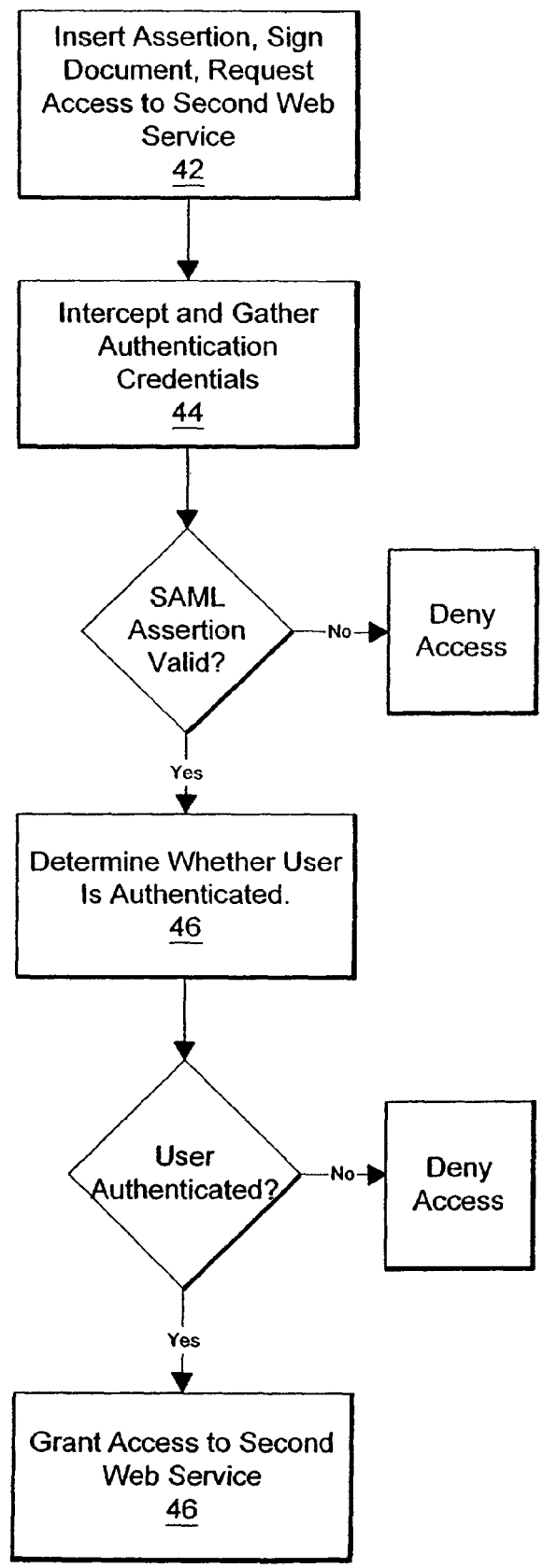
FIG. 2C is a flow chart showing a series of steps for subsequent access in the authentication scheme of FIG. 2A, according to one aspect of the present invention.

For subsequent requests, the following method can be followed, as illustrated in FIGS. 2A and 2C. The Web service consumer 10 places the SAML assertion that it received from the first Web service 18 into a new XML document, signs the XML document with its private key, and requests access to a second Web service 20 (step 42). The request is in the form of an XML document. The XML Agent 14 intercepts the request and validates the SAML assertion by ensuring the XML document was signed with the private key that matches the public key (step 44). If the SAML assertion is valid, the XML Agent 14 uses the session ticket ID with the SAML assertion to determine if the user is authenticated to access the second Web service 20 (step 46). If the user is authenticated, the Web server 12 grants access to the Web service consumer 10 without the Web service consumer 10 having to re-authenticate because of information in the assertion (step 48). This results in single sign-on functionality. If either the SAML assertion or the user authentication are invalid, the user is denied access.

In accordance with another example embodiment of the present invention, a chain Web service model is provided. A chain Web service model is an environment in which the first Web service in the chain is responsible for authenticating clients and generating assertions. The Web service binds each assertion to the requesting XML document and passes the document to downstream Web services for processing by other applications.

In the chain model, the client request must be an XML document. However, there is no requirement for the client to supply a public key. The XML Agent dynamically generates a public key and private key pair, and then creates the SAML assertion. The SAML assertion contains a session ticket and the public key corresponding to the generated private key. The XML Agent then signs the XML document with its private key, which binds the XML document to the SAML assertion.

After the SAML assertion and the XML document are issued, an application passes the XML document to the next Web service in the chain. When a downstream Web service receives the XML document, the SAML session ticket authentication scheme verifies the XML document's signature and validates the originator of the document based on the session ticket in the SAML assertion. The application receiving the XML document can then process the XML document and send the XML document to other Web services protected by the SAML authentication scheme.

Figure 3A:
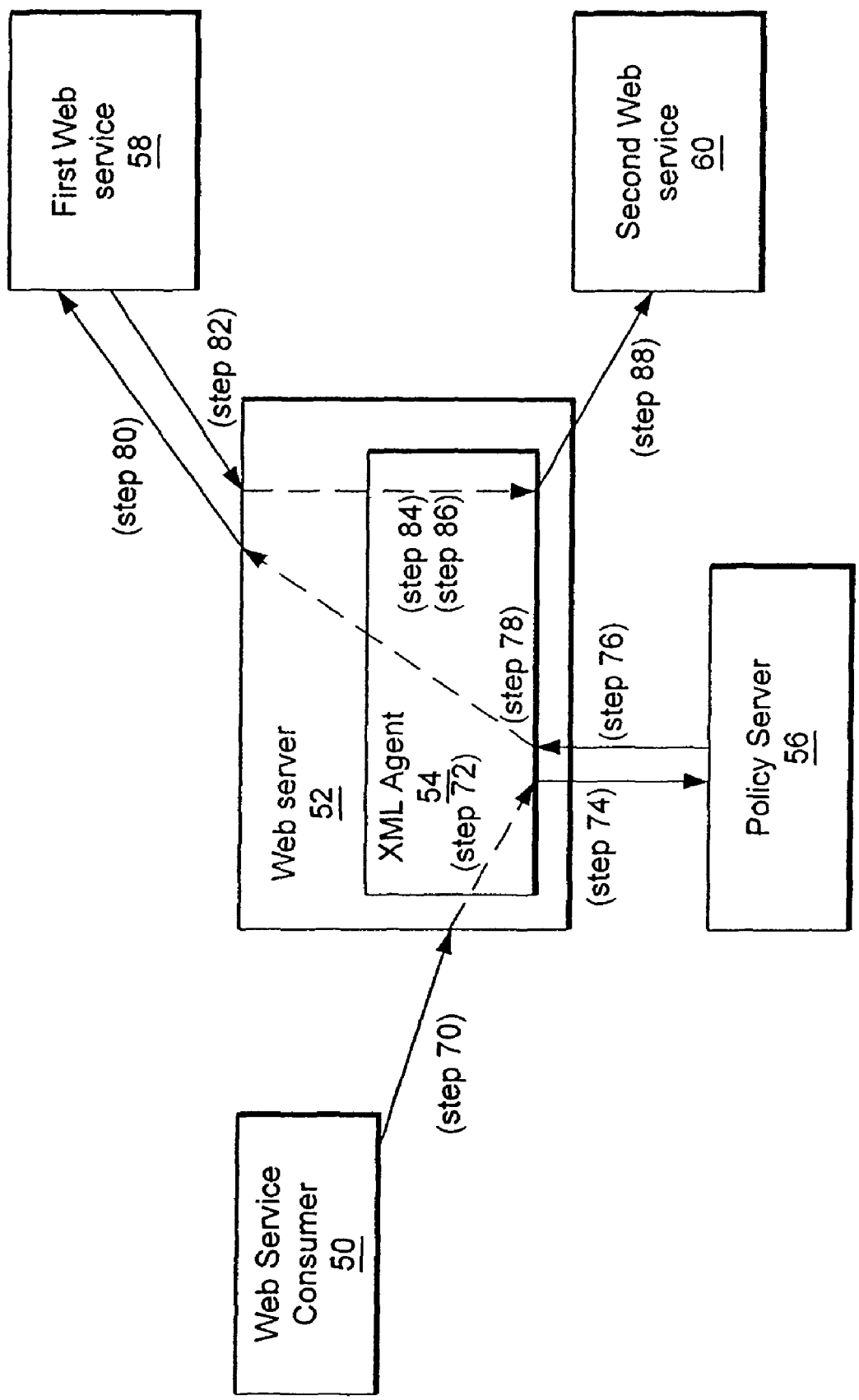
FIG. 3A is a diagrammatic illustration of an authentication scheme variation, according to one aspect of the present invention.
Figure 3B:
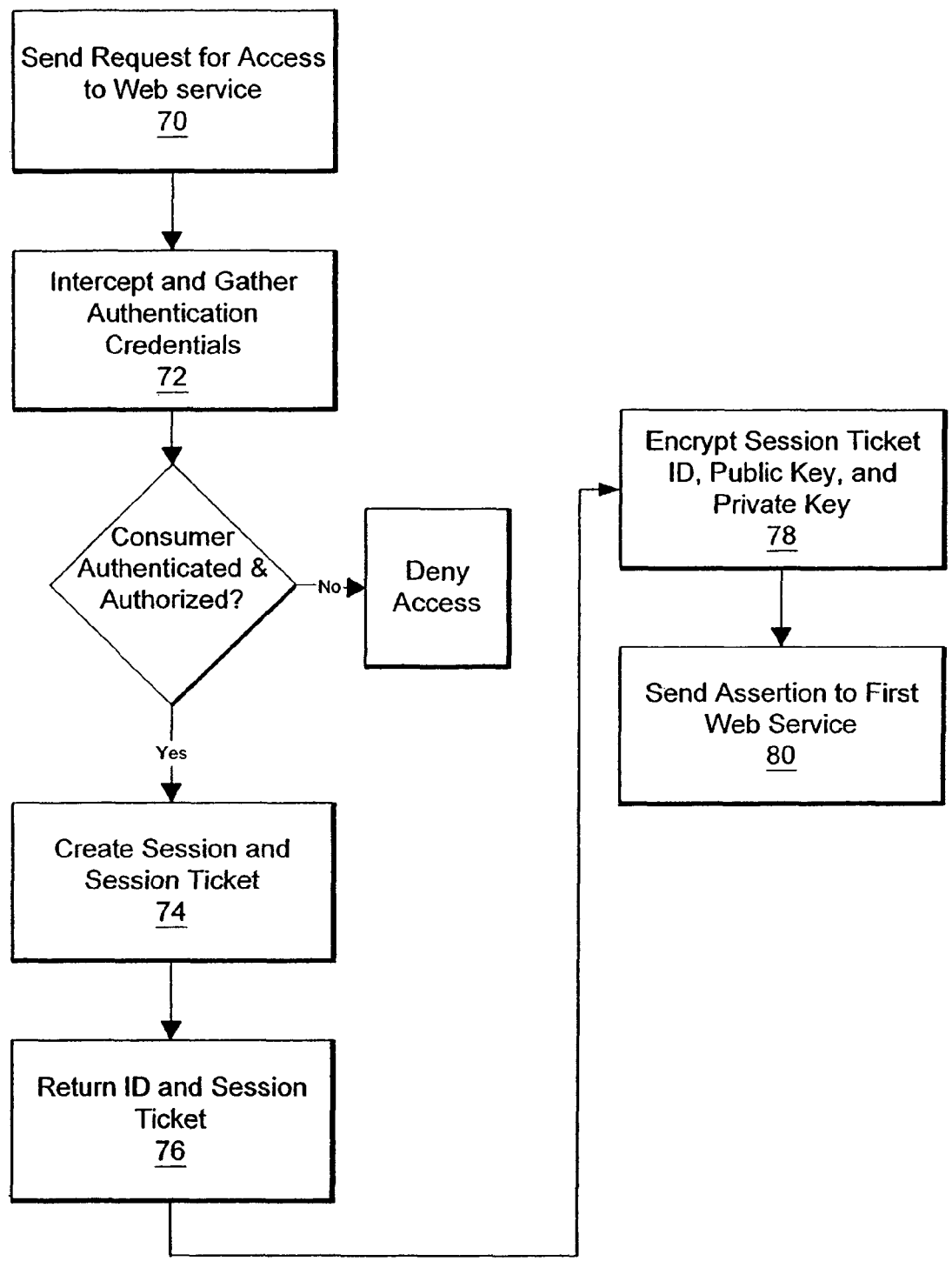
FIG. 3B is a flow chart showing a series of steps in the authentication scheme variation of FIG. 3A, according to one aspect of the present invention.

FIGS. 3A and 3B illustrate the chain Web service example embodiment in accordance with teachings of the present invention. A client in the form of a Web service consumer 50 sends a request to a Web server 52 to gain access to a first Web service 58 (step 70). An XML Agent 54 intercepts the request and gathers the authentication credentials of a user associated with the request (step 72). The XML Agent 54 determines whether the Web service consumer 50 is authenticated and authorized for access to the first Web service 58, and if the Web service consumer 50 is authenticated and authorized for access to the first Web service 58, then a session and session ticket are created (step 74) within a Policy Server 56. The determination of whether the Web service consumer 50 is authenticated and authorized can result from, for example, a comparison of the credentials provided by the consumer 50 against a database containing records of consumers that are allowed to gain access to the Web server 52. If the user cannot be authenticated or is not authorized, access is denied. The ID for the session ticket is passed back to the XML Agent 54 (step 76). The XML Agent 54 encrypts the concatenation of the session ticket ID and the public key with a matching private key (step 78). The concatenated encryption is then placed inside a SAML assertion, which the XML Agent 54 sends to the first Web service 58 (step 80).

Figure 3C:
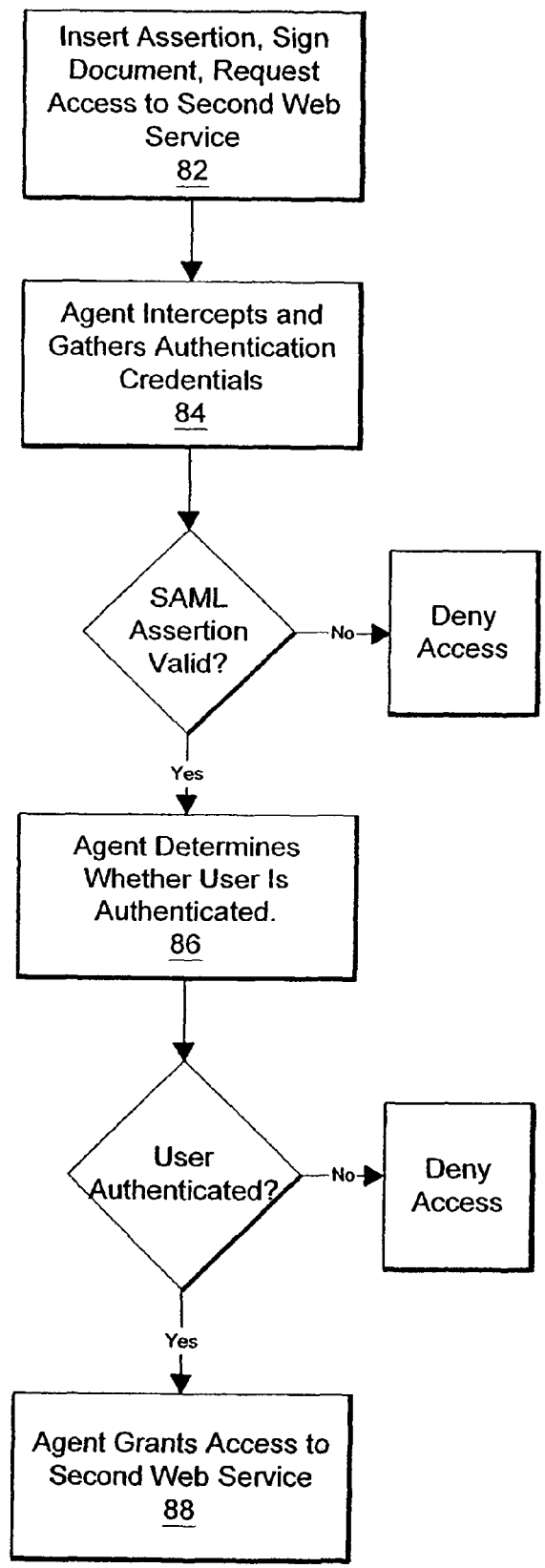
FIG. 3C is a flow chart showing a series of steps for subsequent access in the authentication scheme variation of FIG. 3A, according to one aspect of the present invention.

Sometimes, during processing, a Web service requires direct access to another Web service. FIGS. 3A and 3C illustrate an example embodiment for providing such access. During processing, the first Web service 58 places the SAML assertion that it received from the XML Agent 54 into a new XML document, signs the document, and sends a request to the Web server 52 for access to a second Web service 60 (step 82). The XML Agent 54 intercepts the request and validates the SAML assertion by ensuring that the XML document was signed with the private key that matches the public key (step 84). If the SAML assertion is valid, the XML Agent 54 utilizes the session ticket ID with the SAML assertion to determine if the user associated with the request is authenticated to access the second Web service 60 (step 86). If the user is authenticated, the Web server 52 grants access to the Web service consumer 50 without the Web service consumer 50 having to re-authenticate because of information in the assertion (step 88). This results in single sign-on functionality. If either the assertion or the authentication is invalid, access is denied.

In addition to the above embodiments, the teachings of the present invention further extend to provide a third party with a mechanism for authenticating a document. The Web service consumer 10 or 50 first completes an authentication with establishment of a valid assertion with a public and private key pair as described above or with equivalent methods as understood by one of ordinary skill in the art. The Web service consumer 10 or 50 can then forward a document to a third party, the document containing the assertion. The third party can then validate the authenticity of the document from the Web service consumer 10 or 50 by checking with the system supporting the authentication scheme. If the system verifies the signature and assertion, the third party is assured of the origin of the document. The third party may then use the document based on the terms and conditions associated with issuing site's agreement with the third party regarding such authentication verifications. An example embodiment of the described authentication service can include the third party signed document being a credit card. The verification from the issuing site equates to the authorization a merchant receives when validating a credit card for a specific purchase. This described process and illustrative embodiment, in addition to other equivalent embodiments and combinations of authentication steps and parties requiring verification, are intended to fall within the scope of the teachings of the present invention.

In conventional networks, there is no functional element for propagation of a user's authentication and/or session information between different requests to different Web services. The user must be authenticated each time they access a Web service. The teachings of the present invention facilitate, using SAML session tickets, the authentication of the user a single time, permitting subsequent access to multiple different Web services in a domain without re-authentication/re-authorization. The system and method of the authentication scheme of the present invention generate a SAML assertion that binds to a session ticket with the user's public key through encryption. This assertion can then be utilized for authentication in subsequent requests to Web services in the same domain. If a request is a signed document with an assertion, the Policy Server can ensure that the message is from the entity holding the private key that matches the public key in the assertion. After the initial authentication, the public key in the assertion secures the transaction with the subsequent Web service. Even if an unauthorized party obtains the assertion, they still cannot breach security because they do not have the requisite private key. Further, for authentication service environments, the public key eliminates the need for all Web service connections to be at the secure sockets layer (SSL). Only the connection to the Web server issuing the assertion needs to be an SSL connection. However, SSL still has value for encryption purposes. The authenticated consumer can then include the assertion in later documents sent to third parties with access to the authentication service that created the assertion with public and private key combinations. The third parties can then authenticate the source of the document with the help of the authentication service.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure and method may vary substantially without departing from the spirit of the invention, and exclusive use of all modifications that come within the scope of the disclosed invention is reserved.

What is claimed is:

1. A method comprising:
   intercepting at an agent residing on a processor-controlled server a first request to grant a web service customer access to a first web service, the agent residing between the web service customer and the first web service and between the web service customer and a second web service;
   collecting at the agent one or more authentication credentials of the web service customer;
   determining at the agent whether the web service customer is authenticated and authorized;
   if the web service customer is authenticated and authorized, at the agent: granting the first request; initiating creation of a session and a session ticket; obtaining a session ticket ID for the session ticket; and
   encrypting the session ticket ID and a public key into an assertion; intercepting at the agent a second request to grant the web service customer access to the second web service, the second request comprising the assertion and a signature associated with a private key; and
   if the private key matches the public key in the assertion, granting at the agent the second request without reauthenticating or reauthorizing the web service customer.

2. The method of claim 1, wherein the assertion comprises a Security Assertions Markup Language (SAML) assertion.

3. The method of claim 1, wherein the agent comprises an Extensible Markup Language (XML) agent.

4. The method of claim 1, wherein determining whether the web service customer is authenticated and authorized comprises comparing the web service customer with a database containing authentication and authorization data.

5. The method of claim 1:
   wherein the first request and the second request both originate at the web service customer; and
   the method further comprising communicating the assertion to the web service customer to enable the web service customer to access the second web service without reauthentication or reauthorization after the web service customer accesses the first web service.

6. The method of claim 1:
   wherein the first request originates at the web service customer and the second request originates at the first web service; and
   the method further comprising communicating the assertion to the first web service to enable the web service customer to access the second web service without reauthentication or reauthorization after the web service customer accesses the first web service.

7. The method of claim 6, wherein the second request is intercepted at the agent before reaching the second web service.

8. The method of claim 6, wherein the second request originates at the first web service independent of the web service customer requesting access to the second web service.

9. The method of claim 1, further comprising
at the agent, placing the assertion into a header;
sending the assertion to the first web service;
returning the assertion to the web service consumer.

10. The method of claim 1, wherein the second request comprises an XML document containing the assertion; and
wherein the web service customer has signed the XML document with the private key.

11. The method of claim 1, wherein granting at the agent the second request without reauthenticating or reauthorizing the web service customer further comprises:
using, at the agent, the session ticket ID with the assertion to determine if the web service customer is authenticated to access the second web service; and
if the user is authenticated, granting at the agent the second request without reauthenticating or reauthorizing the web service customer.

12. The method of claim 1, wherein the second request is intercepted at the agent before reaching the second web service.

13. The method of claim 1, further comprising determining at the agent whether the public key matches the private key.

14. A method comprising:
intercepting at an agent residing on a processor-controlled server a request to grant a web service customer access to a first web service, the agent residing between the web service customer and the first web service and between the web service customer and a second web service, the request comprising an encrypted assertion and a signature associated with a private key, the encrypted assertion comprising a public key and a session ticket ID for a session ticket obtained prior to the request and in response to authentication and authorization of the web service customer for access to the second web service; and
if the private key matches the public key in the assertion, granting at the agent the second request without reauthenticating or reauthorizing the web service customer.

15. The method of claim 14, wherein the assertion comprises a Security Assertions Markup Language (SAML) assertion.

16. The method of claim 14, wherein the request originates at the web service customer.

17. The method of claim 14, wherein request originates at the second web service.

18. An apparatus comprising:
one or more processors residing between a web service customer and a first web service and between the web service customer and a second web service; and
a memory coupled to the processors comprising one or more instructions executable at the processors, the processors operable when executing the instructions to:
intercept a first request to grant the web service customer access to the first web service;
collect one or more authentication credentials of the web service customer;
determine whether the web service customer is authenticated and authorized;
if the web service customer is authenticated and authorized:
grant the first request;
initiate creation of a session and a session ticket;
obtain a session ticket ID for the session ticket; and
encrypt the session ticket ID and a public key into an assertion;
intercept a second request to grant the web service customer access to the second web service, the second request comprising the assertion and a signature associated with a private key; and
if the private key matches the public key in the assertion, grant the second request without reauthenticating or reauthorizing the web service customer.

19. The apparatus of claim 18, wherein the assertion comprises a Security Assertions Markup Language (SAML) assertion.

20. The apparatus of claim 18, wherein the agent comprises an Extensible Markup Language (XML) agent.

21. The apparatus of claim 18, wherein the processors are further operable when executing the instructions to determine whether the web service customer is authenticated and authorized by comparing the web service customer with a database containing authentication and authorization data.

22. The apparatus of claim 18, wherein:
the first request and the second request both originate at the web service customer; and
the processors are further operable when executing the instructions to communicate the assertion to the web service customer to enable the web service customer to access the second web service without reauthentication or reauthorization after the web service customer accesses the first web service.

23. The apparatus of claim 18, wherein:
the first request originates at the web service customer and the second request originates at the first web service; and
the processors are further operable when executing the instructions to communicate the assertion to the first web service to enable the web service customer to access the second web service without reauthentication or reauthorization after the web service customer accesses the first web service.

24. A system comprising:
a first web service;
a second web service; and
an agent residing between a web service customer and the first web service and between the web service customer and the second web service, the agent residing on a processor-controlled server and operable to:
intercept a first request to grant the web service customer access to the first web service;
collect one or more authentication credentials of the web service customer;
determine whether the web service customer is authenticated and authorized, and if the web service customer is authenticated and authorized:
grant the first request;
initiate creation of a session and a session ticket;
obtain a session ticket ID for the session ticket; and
encrypt the session ticket ID and a public key into an assertion;
intercept a second request to grant the web service customer access to the second web service, the second request comprising the assertion and a signature associated with a private key; and
if the private key matches the public key in the assertion, grant the second request without reauthenticating or reauthorizing the web service customer.

* * * * *